Nov. 20, 1923.
F. E. BIDDINGER
1,474,343
ICE CUTTING IMPLEMENT
Filed Nov. 17, 1921
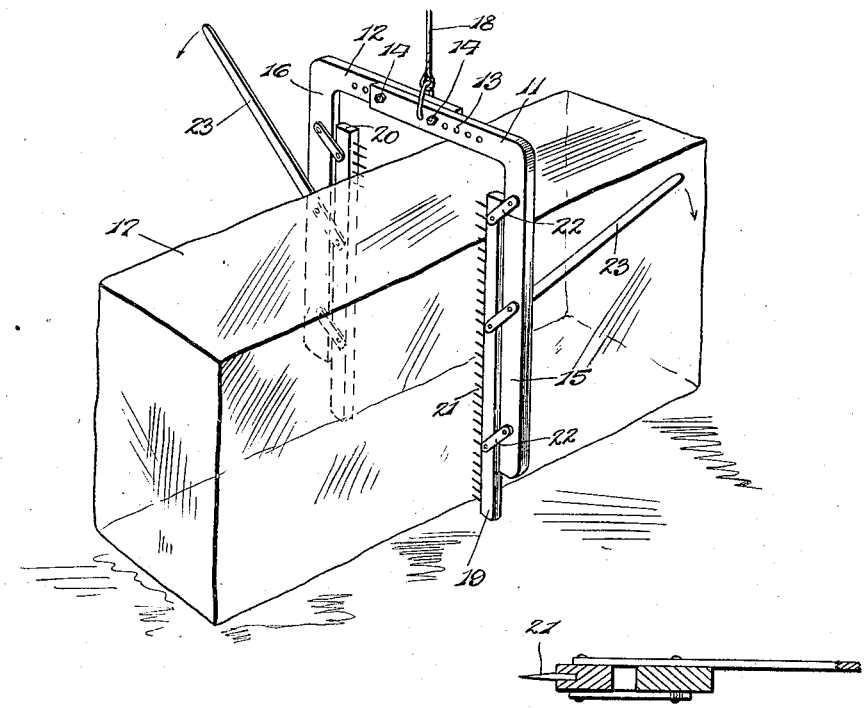
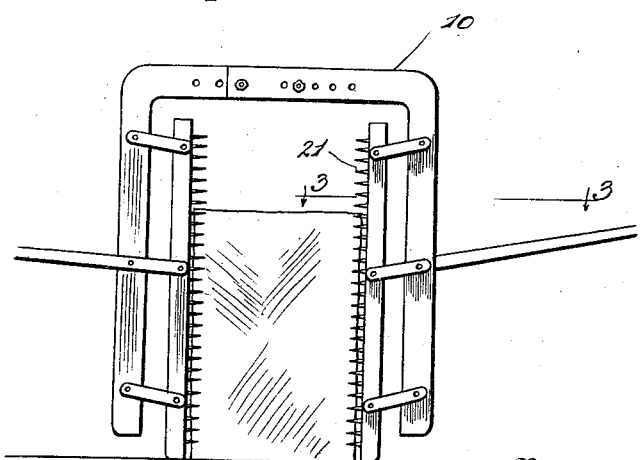
Inventor
F. E. Biddinger.
By
Lacy & Lacy, Attorneys Patented Nov. 20, 1923.

1,474,343

UNITED STATES PATENT OFFICE.

FRANK E. BIDDINGER, OF NASHVILLE, TENNESSEE.

ICE-CUTTING IMPLEMENT.

Application filed November 17, 1921. Serial No. 515,836.

*To all whom it may concern:*

Be it known that I, FRANK E. BIDDINGER, a citizen of the United States, residing at Nashville, in the county of Davidson and State of Tennessee, have invented certain new and useful Improvements in Ice-Cutting Implements, of which the following is a specification.

My invention relates to a device for cutting ice cakes into small pieces of suitable size for retail trade or for delivery to customers. The main object of the invention is to supply an implement of this class, which can cut the ice cakes very rapidly, almost instantaneously and practically without any waste.

The implement can be constructed either as a portable or as a stationary device, which only differ in size, as the design of both is the same and both being adjustable to the thickness of the ice cakes.

In the accompanying drawing one embodiment of the device is illustrated, and

Figure 1 shows the implement in perspective view straddling an ice cake preparatory to dividing the same;

Figure 2 is a front elevation of the implement in operation; and

Figure 3 is a horizontal cross section along line 3—3 of Figure 2 and in larger scale.

The implement consists of an open or bifurcated frame 10 which is preferably made in two parts of L-shape. The shorter shanks 11 and 12 of this part are provided with a plurality of oppositely arranged holes 13 and bolts 14 engaging in these holes, so as to secure the shanks 11 and 12 rigidly together. In this manner the shanks may be shifted in or out in accordance with the thickness of the ice cakes, so that the upright shanks 15 and 16 are able to straddle over the ice cake 17.

The frame 10 may be suspended from a beam or the ceiling in a house by means of a suitable rope or chain 18.

The cutting device proper consists of two bars 19 and 20 into which a number of pointed teeth 21 are inserted along one edge thereof, so as to protrude with their pointed ends in parallel rows along the inner side of the bars 19 and 20. These teeth 21 are preferably made of hard steel wire and detachable from the bars 19 and 20 so that they may be easily replaced whenever broken.

By means of links 22 or any other suitable means, the bars 19 and 20 are movably connected with the opposing shanks 15 and 16 of the frame 10 so that the bars may be given a parallel movement in the frame and toward each other.

Upon each shank 15 and 16 is fulcrumed a lever 23 the inner end of which is engaged with the corresponding bar 19 or 20. When the bars 19 and 20 lie along the sides of the respective shanks 15 and 16 of the frame 10, the levers 23 point upward and the implement is made to straddle with the parts in this position over an ice cake 17, whereupon the levers are pressed downward. This will force the bars 19 and 20 with their teeth 21 against the cake of ice, until the points 21 enter the latter, which will ultimately split along the row of teeth on each side. The pressing down of the levers 23 is assisted by the weight of the frame. It should be observed that the length of the bars 19 and 20 is approximately the same as the length of the shanks 15 and 16. In placing the implement over an ice cake the levers 23 should be held upward, as far as they will go, so that the opening between the teeth is the widest and the two bars 19 and 20 lie along the shanks 15 and 16 and project below the latter. When the implement then straddles the ice cake it will rest on the lower ends of the bars 19 and 20, so that the entire weight of the frame 11 will bear upon these two bars, thereby assisting in cutting the ice when the levers are being lowered.

Instead of providing links 22 for connecting the bars 19 and 20 to the frame 11, any other suitable connection may be used and I do not limit myself to the specific construction shown on the drawings.

Upon lowering the levers 23 it will be noted that the teeth 21 will travel inwardly rapidly at first and slowly toward the end of the operation. The teeth will first get a good hold in the sides of the ice cake, which will then easily break up, when full force on the lever is exerted.

For the larger or stationary ice cutting implement a stand may be provided.

When accompanying an ice wagon, the implement will not be very heavy and may be easily handled without having to be suspended.

It will be evident that instead of having both toothed bars 19 and 20 movable, one of them may be stationary and the other movable.

Having thus described the invention what is claimed as new is:

1. In an ice cutting implement, a U-shaped frame suspended with its open end downwards to straddle an ice cake, a pair of toothed members mounted on the upright sides of said frame so as to have parallel motion thereon to and from each other in substantially horizontal direction and means for actuating said members.

2. In an ice cutting implement, a U-shaped frame suspended with its open end downwards to straddle an ice cake, a pair of toothed members mounted on the upright sides of said frame so as to have parallel motion thereon to and from each other in substantially horizontal direction and means for actuating said members, said members being provided with pin shaped replaceable teeth.

3. In an ice cutting implement, a bifurcated frame comprising two L-shaped elements with adjustable engagement along their adjacent shanks; a pair of toothed members mounted with their teeth facing each other, link connection between each of said members and the corresponding shank of said frame, and means for operating said members.

4. In an ice cutting implement, a bifurcated frame comprising two L-shaped elements with adjustable engagement along their adjacent shanks; a pair of toothed members mounted with their teeth facing each other, said teeth being replacable, link connection between each of said members and the corresponding shank of said frame, and means for operating said members.

5. In an ice cutting implement, a bifurcated frame comprising two L-shaped elements with adjustable engagement along their adjacent shanks; a pair of toothed members mounted with their teeth facing each other, link connection between each of said members and the corresponding shank of said frame, a lever for each member fulcrumed on said frame and having engagement with one of said members, whereby parallel motion is given to the member when said lever is operated.

In testimony whereof I affix my signature.

FRANK E. BIDDINGER. [L. S.]